2 Sheets—Sheet 1.
C. E. BOLTON, F. H. STRIEBY & M. RANKIN.
Box and Package Filler.
No. 218,658. Patented Aug. 19, 1879.
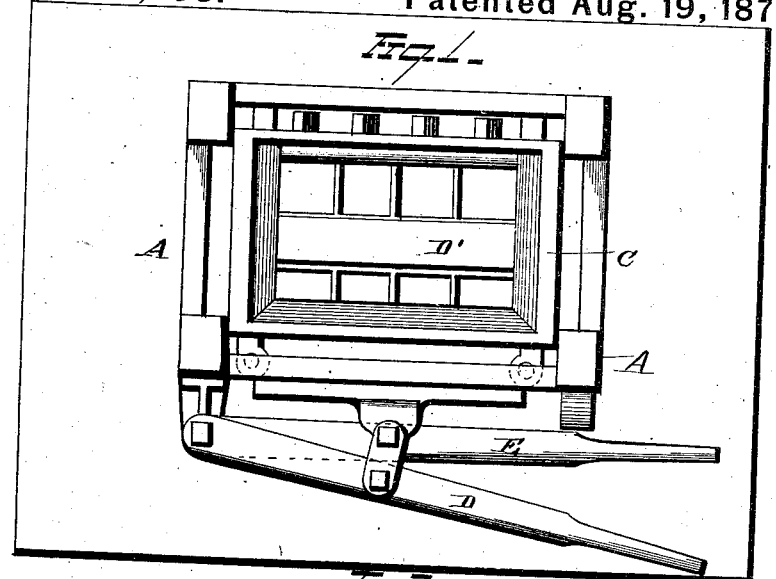
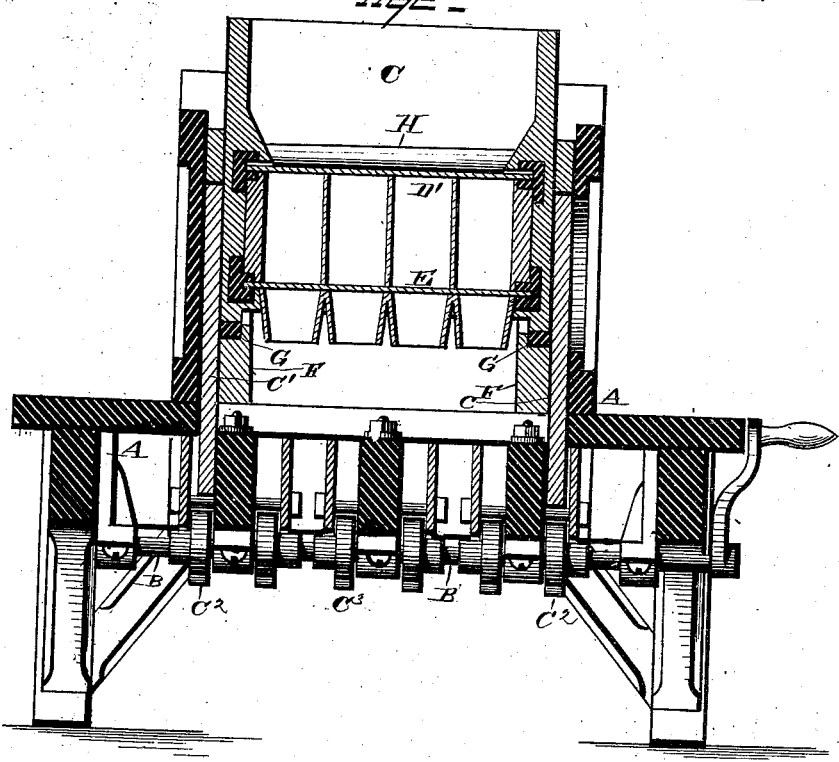
WITNESSES
E. J. Nottingham
A. W. Bright
INVENTORS
Chas E. Bolton
Frank H. Strieby
Matthew Rankin
By Leggett & Leggett, ATTORNEYS C. E. BOLTON, F. H. STRIEBY & M. RANKIN.
Box and Package Filler.
No. 218,658. Patented Aug. 19, 1879.
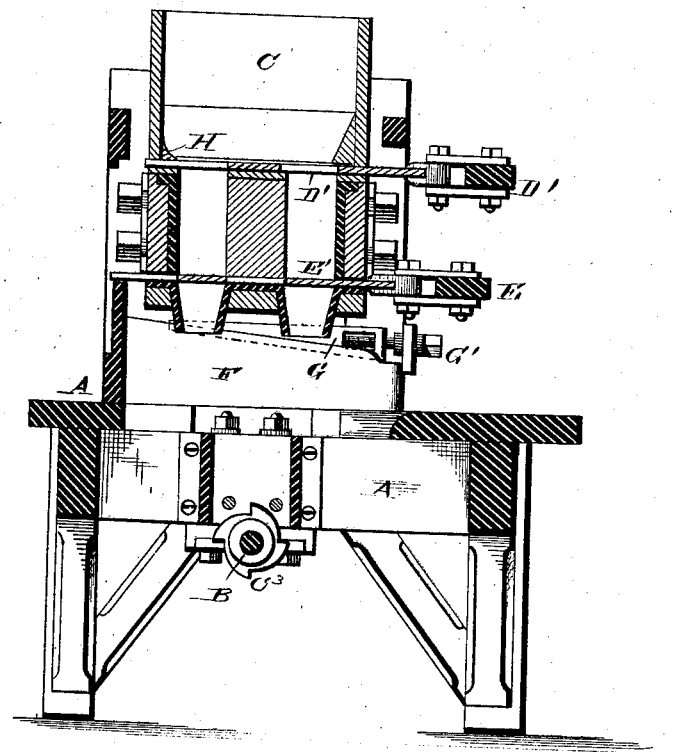
WITNESSES
E. J. Aollingham
A. W. Bright
INVENTORS
Chas. E. Bolton.
Frank H. Strieby.
Matthew Rankin.
By Leggett & Leggett, ATTORNEYS.

UNITED STATES PATENT OFFICE.

CHARLES E. BOLTON, FRANK H. STRIEBY, AND MATTHEW RANKIN, OF CLEVELAND, OHIO.

IMPROVEMENT IN BOX AND PACKAGE FILLERS.

Specification forming part of Letters Patent No. 218,658, dated August 19, 1879; application filed July 2, 1879.

*To all whom it may concern:*

Be it known that we, CHARLES E. BOLTON, FRANK H. STRIEBY, and MATTHEW RANKIN, of Cleveland, in the county of Cuyahoga and State of Ohio, have invented certain new and useful Improvements in Box or Package Fillers; and we do hereby declare the following to be a full, clear, and exact description of the invention, such as will enable others skilled in the art to which it pertains to make and use it, reference being had to the accompanying drawings, which form part of this specification.

Our invention relates to a new and useful improvement in box and package fillers, and is designed as an improvement upon the device patented by Bolton and Strieby, February 18, 1879, No. 212,349.

Our invention consists, first, in mechanism whereby the material is caused to feed uniformly from the hopper, consisting of mechanism for agitating the hopper; secondly, in rounding the lower inside edge of the hopper, to prevent the feeding blades or valves from clogging; also, in means for adjusting the distance through which the hopper is agitated.

In the drawings, Figure 1 is a plan view. Fig. 2 is a longitudinal central section through the hopper, illustrating the rounding of its inner lower corner. Fig. 3 is a separate view in section and elevation, illustrating the manner of agitating and adjusting the distance through which the hopper is agitated.

Heretofore, in the employment of the machine above mentioned, it has proven exceedingly difficult to make the hopper feed uniformly into the different boxes or packages, and this has been true notwithstanding the adjustable plate employed in that apparatus.

In the said drawings, A is a suitable frame. B is the drive-shaft. C is the hopper. D is the lever by which the upper valves, D', are opened in order to fill the measures below. E is the lever by which the lower valves, E', are opened in order to discharge from the said measures into the packages.

Heretofore the hopper has not been agitated; but we connect the hopper with the driving mechanism in any suitable manner so as to agitate the said hopper, in order that the material within the hopper shall feed uniformly through the upper valves into the measures.

This may be accomplished in any desired manner, the means shown in the drawings being practicable, in which $C^1$ are projections extending down from the hopper and bearing upon ratchet-cams $C^2$ on the shaft B, so that with every revolution of the shaft the hopper is agitated one or more times, depending upon the number of ratchets on the cam $C^2$. Similar cams located between the sides of the frame may serve to agitate the tray which contains the boxes or packages, in order to settle the material in the latter.

In order that the degree of agitation of the hopper may be regulated, we provide any suitable means for this purpose, and have found the following to be very efficacious: F is a stationary inclined bearing or surface, upon which rests a wedge, G, which wedge may be adjusted out or in by a screw, G'. The upper portion of this wedge bears against a portion of the hopper-frame, so that by adjusting the wedge in or out the hopper may be brought nearer to or farther from the cams $C^2$, and thereby cause the agitation to be correspondingly altered.

H is a fillet, occupying the lower inside edge of the hopper upon that side toward which the valve D' closes after the measures have been filled. If such a fillet is not employed, the valve in closing will compress or cake a portion of the material between its edge and the side of the hopper; but by employing this fillet H the valve will, by pressing against the material, cause it to slide upon the inclined fillet, instead of packing in front of the valve or blade.

We find that by thus forming the hopper so that it may be agitated, and by employing the fillet H, the package-filler is caused to work very accurately, the measures are always properly filled, and no trouble arises from packing when closing the valves D'.

We do not limit ourselves to the particular method here shown for agitating the hopper, nor to the particular means for adjusting the throw of the hopper in agitating it, for various appliances might be employed which would accomplish the same object.

Heretofore we have found that when apparatus for agitating the tray beneath the hopper has been located at the ends of the tray, the material at the center was not properly settled. We have therefore found it advisable to employ agitating apparatus which will operate upon the tray at different points between the ends, as well as at the ends. This, as before explained, may be by any suitable means. In the drawings cams $C^3$ are employed for the purpose, though, if desired, a single cam may be made to extend from one end of the tray to the other, so as to bear upon it throughout.

What we claim is—

1. In a box or package filler, the combination, with a hopper, of mechanism, substantially as described, adapted to agitate said hopper while the material is being fed into the measures, substantially as set forth.

2. The hopper C, in combination with a cam, $C^2$, whereby the hopper is agitated, substantially as and for the purposes described.

3. The combination, with the hopper and a cam for agitating the same, of an adjustable wedge, G, whereby the distance through which the hopper is agitated is regulated, substantially as and for the purposes described.

4. The combination, with the hopper and agitating-cam, of mechanism for regulating the throw of the hopper as it is agitated, substantially as and for the purposes described.

5. The combination, with the hopper and valve D', of the fillet H, whereby the packing of the material in front of the valve is prevented, substantially as and for the purposes described.

6. The combination, with the hopper, of stationary bearing F, wedge G, and adjusting-screw G', substantially as and for the purposes described.

7. In a box or package filler, the combination, with the tray for holding the boxes or packages to be filled, of agitating apparatus adapted to operate against the tray along its whole length, or at the ends and at intermediate points, substantially as and for the purposes described.

In testimony whereof we have signed our names to this specification in the presence of two subscribing witnesses.

CHARLES E. BOLTON.
FRANK H. STRIEBY.
MATTHEW RANKIN.

Witnesses:
LEVERETT L. LEGGETT,
WILLARD FRACKER.